UNITED STATES PATENT OFFICE.

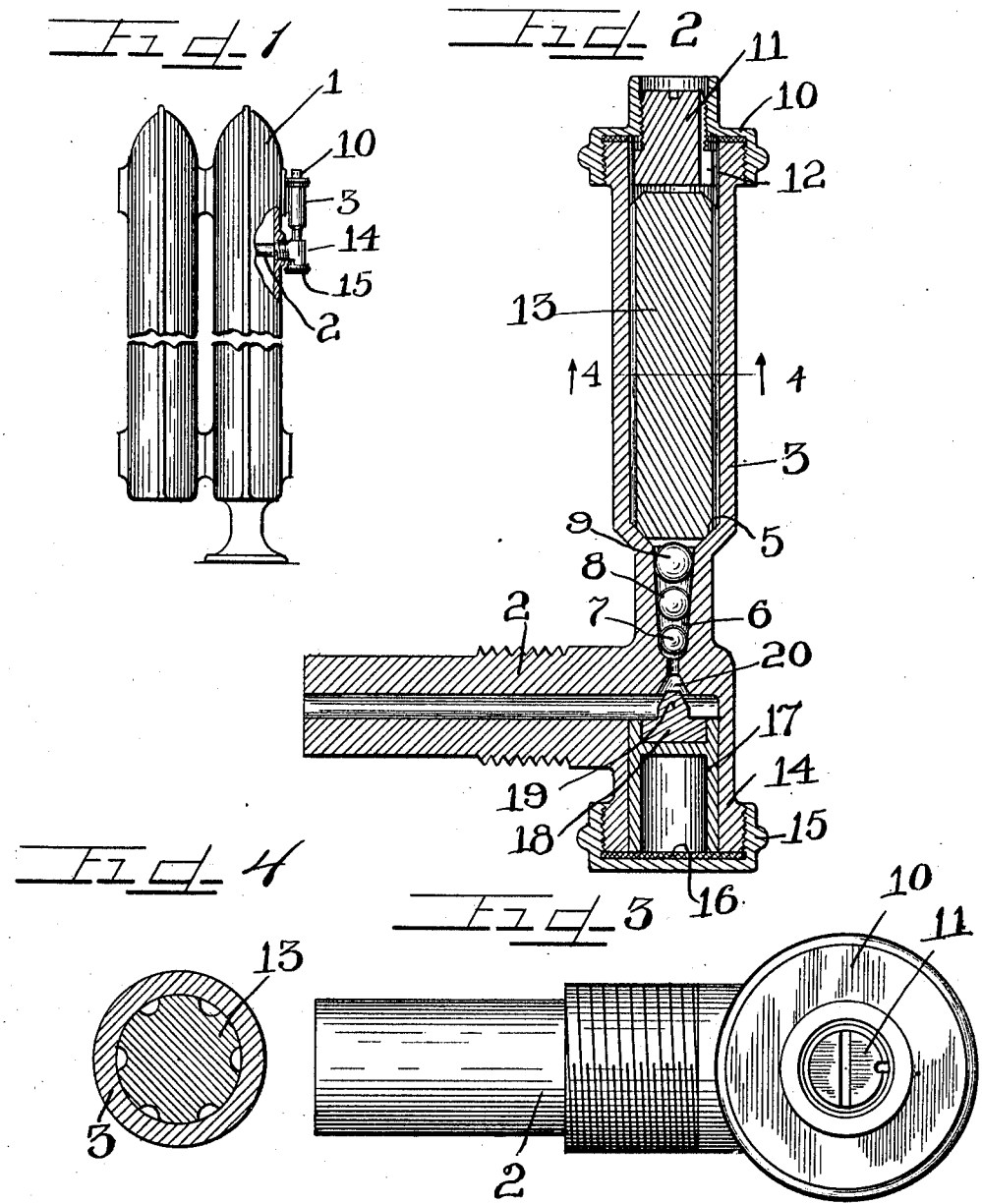

ARTHUR O'BRIEN, OF BUTTE, MONTANA, ASSIGNOR OF ONE-HALF TO ALF C. KREMER AND WILLIAM M. KIRKPATRICK, OF BUTTE, MONTANA.

AUTOMATIC RADIATOR-VALVE.

1,004,298.

Specification of Letters Patent.

Patented Sept. 26, 1911.

Application filed October 25, 1909. Serial No. 524,302.

*To all whom it may concern:*

Be it known that I, ARTHUR O'BRIEN, a citizen of the United States, and a resident of the city of Butte, in the county of Silverbow and State of Montana, have invented certain new and useful Improvements in Automatic Radiator-Valves; and I do hereby declare that the following is a full, clear, and exact description of the same, reference being had to the accompanying drawings, and to the numbers of reference marked thereon, which form a part of this specification.

This invention relates to that class of automatic air valves adapted for use in connection with steam radiators or the like, to permit the escape of air therefrom when the heat is turned on. Numerous devices and valves for this purpose have heretofore been devised, some of which have proven ineffective and insufficient for the purpose for which intended owing to the fact that the valve closure therein soon becomes more or less worn from use and fails to seat sufficiently well to prevent the escape of water through the valve. This, of course, frequently results in serious damage and loss. Some of such valves act expansively in closing against steam pressure, but it is important as well to provide positive means for closing when the radiator is cold and in this respect such valves are frequently defective.

The object of this invention is to afford an air valve adapted to act expansively in closing against steam pressure and provided with a plurality of valves for closing against atmospheric pressure when the radiator is cooling.

It is also an object of the invention to provide an auxiliary valve for closing against water.

The invention consists in the matters hereinafter described and more fully pointed out and defined in the appended claims.

In the drawings: Figure 1 is a fragmentary side elevation of a radiator equipped with an air valve embodying my invention. Fig. 2 is an enlarged vertical section of the air valve. Fig. 3 is a top plan view thereof. Fig. 4 is a section on line 4—4 of Fig. 1, with parts omitted.

As shown in the drawings: 1, indicates a radiator provided with the usual threaded aperture in the side of one of the sections thereof into which the valve is threaded. Said valve comprises an elongated end or branch 2, threaded at a point remote from its extremity, said unthreaded end being sufficiently long to extend well within the radiator coil or section, as shown in Fig. 1. Said branch or end is provided with an interior bore or steam passage and integrally connected with said threaded end and on the upper side thereof is an upwardly extending valve casing 3, open at its upper end and externally threaded at its upper end, as shown in Fig. 2. Said casing is provided with a downwardly tapering valve seat 5, near its lower end and extending downwardly from said seat is a conically tapered seat 6, which communicates at its lower end with the passage in said end or branch. Seated in said conical passage or seat 6, are three balls 7, 8, and 9, which are of a sufficient size to seat therein each without contact with the others, as shown in Fig. 2. The lowermost of said balls, (that indicated by 7) extends to the bottom thereof and seats to entirely close the aperture leading from the passage in said stem end. Threaded on the upper end of said casing 3, is a cap 10, provided with a central bore therethrough also screw threaded, in which is threaded the adjusting screw 11. This, as shown, is provided with a peripheral flange within said cap 10, to prevent the same being threaded entirely out of the same and is provided with a longitudinal slot 12, in the side thereof to afford a vent and in its upper end is provided with a transverse slot to afford engagement with a screwdriver or any other suitable tool to adjust the same. Within said casing is the expansion rod 13. This may be a solid rod of copper vulcanite, or any suitable material and is rounded at both ends complementally with the seat 5, at the lower end of the casing so as to insure seating fairly thereon whichever end is inserted first in the casing. Said expansion rod or bar is longitudinally grooved on its sides thereof, as shown in Fig. 4, to permit the ready escape of air when said rod is lifted by the pressure thereof from below. The degree of opening, of course, is determined by the adjustment of the adjusting screw 11, which, when the device is assembled, is set so that there is the requisite space between the top of the expansion rod 13, and the bottom of said adjusting screw. Extending downwardly below and in alinement with said casing is a centrally apertured extension 14, which at its lower end is externally threaded to receive the screw cap 15, and packing 16. Removably engaged in the bore in said extension is a cylindric body 17, having a seat in its upper end, as shown in Fig. 2, in which is provided a float 18, of any suitable material which is provided centrally with a conical, upwardly tapering closure 19, which seats in the aperture 20, leading into said casing 3.

The operation is as follows: Having threaded the valve into place, the plain end thereof extends well within the radiator section and is subjected at all times to the heat of the radiator. The casing 3, is turned upwardly, as shown, and the balls, 7, 8, and 9 (of successively larger size) seat on the side walls of the tapered seat 6. The adjusting screw 11, is set up to a point such that the expansion of the expansion rod 13, when subjected to the relatively high temperature of the steam is sufficient to elongate the expansion rod to positively bear against said adjusting nut and the seat 5, in the bottom of the casing. This immediately closes the valve and precludes the escape of steam therethrough. In cooling, it is true that the expansion rod 13, contracts to an extent that would permit air finding its way therearound into the radiator but the balls 7, 8, and 9, seat in the tapered passage by gravity owing to the release of steam pressure from the radiator, and entirely close said passage. Should the water of condensation or other water ever back up into the valve, flow from the valve is effectively precluded by the float valve 18, supported below the port or passage in the chamber. The inflowing water lifts said closure, and seating the same entirely prevents the escape of water from the radiator.

Of course, but one ball valve may be required. I do not purpose, however, limiting this application for patent to this feature alone, inasmuch as it is obvious that any desired number of the ball valves may be employed to prevent the inflow of air to the radiator. It is obvious also that each if said balls when in bearing forms in fact a separate and distinct valve so that should one of the same fail to seat perfectly, the remaining valves must, of necessity, effectually close the radiator.

Of course, details of construction may be varied, and I therefore do not purpose limiting this application for patent otherwise than necessitated by the prior art.

I claim as my invention:

1. In a radiator valve, a tubular stem, a casing integral therewith having an expansion rod therein, a plurality of ball valves below the expansion rod adapted to seat by gravity and atmospheric pressure to exclude the atmospheric air when the radiator is cool, an extension integral with the stem and having an open lower end, a cylindric body therein having a seat at its upper end, a float valve normally supported below the inlet in the stem by said cylindric body and adapted to seat to prevent water passing from the stem into the casing, and a cap threaded on the lower end of the extension adapted to permit the removal of the float without disturbing the valves in the casing.

2. In a radiator valve, a tubular stem, a casing integral therewith having a conical downwardly tapering passage in the lower end thereof, a plurality of various sized ball valves adapted to seat in said passage, an expansion rod within the casing, an adjusting screw in the upper end of the casing, an extension integral with the stem and having an open lower end, a cylindric body therein having a seat at its upper end, a float valve, below the inlet to the casing normally supported by the cylindric body adapted to prevent water passing from the stem into the casing, and a cap on the lower end of the extension adapted to permit the removal of the float without disturbing the valves in the casing.

3. In a device of the class described a tubular inlet stem, a cylindric casing extending at right angles therewith, an adjustable expansion rod therein seating to afford a valve against internal steam pressure, a plurality of gravity acting ball valves below the expansion rod acting to close against atmospheric pressure, an extension integral with the stem and adjacent the casing, a cylindric body therein having a seat in its upper end and a float valve supported thereby below the inlet in the stem adapted to prevent the outward flow of water.

4. In a device of the class described a tubular stem adapted to be threaded into the radiator and extend well within the same, a casing integral with the stem, an expansion rod within the casing, a conical passage in the lower end of the casing, a plurality of different sized ball valves arranged one above the other in the passage, a centrally apertured extension integral with the stem and adjacent the casing, a screw cap threaded on the lower end thereof, a cylindric body in the extension, a float supported thereby below the inlet in the stem, a central upwardly tapering closure integral with the float and projecting into the inlet in the stem adapted to prevent the outward flow of water.

5. A valve embracing a casing, a tubular stem integral therewith having a passage therein opening through one end thereof, a conical seat in the lower end of the casing, means within the casing to resist the inflow of atmospheric air, a centrally apertured extension integral with said stem, a screw cap threaded on the end of the extension, a cylindric body in the extension, a seat on the upper end thereof and a float supported therein below the inlet provided with a central upwardly tapering closure extending into the inlet and adapted to seat against the conical seat in the lower end of the casing and close the valve against outward flow of water.

In testimony whereof I have hereunto subscribed my name in the presence of two subscribing witnesses.

ARTHUR O'BRIEN.

Witnesses:
W. P. CARY,
MINNIE RODDA.

Copies of this patent may be obtained for five cents each, by addressing the "Commissioner of Patents, Washington, D. C."